(12) United States Patent
Yamada (10) Patent No.: US 7,840,095 B2
(45) Date of Patent: Nov. 23, 2010

(54) IMAGE PROCESSING METHOD, IMAGE PROCESSING APPARATUS, PROGRAM AND RECORDING MEDIUM

(75) Inventor: Rui Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1083 days.

(21) Appl. No.: 11/463,805

(22) Filed: Aug. 10, 2006

(65) Prior Publication Data

US 2007/0041664 A1 Feb. 22, 2007

(30) Foreign Application Priority Data

Aug. 18, 2005 (JP) ............... 2005-237926

(51) Int. Cl.
  *G06K 9/00* (2006.01)
  *G06K 9/32* (2006.01)
  *H04N 5/228* (2006.01)
  *H04N 7/18* (2006.01)
(52) U.S. Cl. .................. 382/299; 382/103; 382/107; 348/222.1; 348/152
(58) Field of Classification Search ............ 382/100, 382/276, 284, 293–300; 348/207.99, 201.1, 348/222.1
See application file for complete search history.

(56) References Cited

U.S. PATENT DOCUMENTS

| | | | |
|---|---|---|---|
| 5,696,848 A * | 12/1997 | Patti et al. | 382/254 |
| 6,434,280 B1 * | 8/2002 | Peleg et al. | 382/299 |
| 6,903,762 B2 * | 6/2005 | Prabhu et al. | 348/207.1 |
| 7,239,428 B2 * | 7/2007 | Solecki | 358/3.01 |
| 7,382,937 B2 * | 6/2008 | Miller et al. | 382/284 |
| 2003/0016884 A1 * | 1/2003 | Altunbasak et al. | 382/299 |

(Continued)

FOREIGN PATENT DOCUMENTS

JP      08-263639      10/1996

(Continued)

OTHER PUBLICATIONS

Farsiu et al., "Advances and Challenges in Super-Resolution", International Journal of Imaging Systems and Technology, vol. 14, No. 2, (2004), pp. 47-57, Wiley InterScience.*

(Continued)

*Primary Examiner*—Vu Le
*Assistant Examiner*—Nathan Bloom
(74) *Attorney, Agent, or Firm*—K&L Gates LLP (57) ABSTRACT

An image processing apparatus is provided. The image processing apparatus converts moving image data including plural first image data of a first resolution into moving image data including plural second image data of a second resolution. The apparatus generates position alignment data between the target first image data and another first image data other than the target first image data; aligns candidate image data having the second resolution corresponding to the target first image data with the other first image data according to the position alignment data generated; updates the candidate image data to minimize a first difference between the other first image data and the candidate image data position-aligned; and executes the aligning and the updating at least one time, and using the candidate image data having the difference equal to or smaller than a reference value, as the second image data corresponding to the target first image data.

3 Claims, 8 Drawing Sheets

U.S. PATENT DOCUMENTS

2007/0019887 A1* 1/2007 Nestares et al. ............ 382/299

FOREIGN PATENT DOCUMENTS

| JP | 2004-021436 | 1/2004 |
| JP | 2004-088615 | 3/2004 |
| JP | 2004-229004 | 8/2004 |
| JP | 2004-236291 | 8/2004 |
| JP | 2004-247972 | 9/2004 |
| JP | 2004-272751 | 9/2004 |
| JP | 2005-136679 | 5/2005 |

OTHER PUBLICATIONS

Farsiu et al., "Fast and Robust Multi-Frame Super-Resolution", IEEE Transactions on Image Processing, 2004.*

Borman and Stevenson, "Spatial Resolution Enhancement of Low-Resolution Image Sequences, A Comprehensive Review with Direction for Future Research", Laboratory for Image and Signal Analysis, University of Notry Dame, Notre Dame, IN, Jul. 1998.*

Park et al., "Super-Resolution Image Reconstruction: A Technical Overview", Signal Processing Magazine, IEEE, vol. 20, No. 3. (2003), pp. 21-36.*

Hardie et al., "Joint MAP Registration and High Resolution Image Estimation Using a Sequence of Under sampled Images", IEEE Transaction on Image Processing, vol. 6, pp. 1621-1632, 1997.*

Schultz et al., "Extraction of High-Resolution Frames from Video Sequences," IEEE Transactions of Image Processing, vol. 5, pp. 996-1011, Jun. 1996.

Tekalp et al, "High-Resolution Image Reconstruction From Lower-Resolution Image Sequences and Space-Varying Image Restoration," Proceedings of IEEE International Conference on Acoustics, Speech and Signal Processing (ICASSP), vol. 3, pp. 169-172, Mar. 1992.

Tsai et al., "Multiframe Image Restoration and Registration," Advances in Computer Vision and Image Processing, vol. 1, pp. 317-339, 1984.

Lucas et al., "An Iterative Image Registration Technique with an Application to Stereo Vision," Proceedings of Imaging Understanding Workshop, 1981.

Gotoh, et al., "High Resolution Color Image Reconstruction Using New Raw Data of a Single Imaging Clip", Jun. 2004, vol. 45 No. SIG, pp. 15-27.

Shimizu, et al., Application of 2D Simultaneous Sub Pixel Estimation for Multi-Image Super Resolution from Bayer CFA Data, Graduate School of Science and Engineering, 2003.

Iketani, et al., "Video Mosaicing and Super Resolution for Documents", Camera Parameter Estimation, pp. 49-52.

Tanaka, et al., "Fast Algorithm for Reconstruction-based Super-resolution", CVIM, 2004, pp. 97-104.

* cited by examiner

IMAGE PROCESSING METHOD, IMAGE PROCESSING APPARATUS, PROGRAM AND RECORDING MEDIUM

The present application claims priority to Japanese Patent Application JP 2005-237926 filed in the Japanese Patent Office on Aug. 18, 2005, the entire contents of which being incorporated herein by reference.

BACKGROUND

The present application relates to an image processing method, an image processing apparatus, a program and a recording medium, respectively for making moving image data having a high resolution.

In the field of image processing, one main idea is to improve image resolution. Technologies for creating a high resolution image by enlarging one low resolution image such as through pixel interpolation have been studied. There is a limit, however, in creating a high or super resolution image from a low resolution image because the frequency band of a signal of the low resolution image is limited.

High resolution or super resolution technologies are well known by which a super resolution image having a large number of pixels is created from a plurality of low resolution images. A variety of methods for super resolution analysis have been proposed. Well known methods include a method using a frequency space (refer to "Multiframe image restoration and registration", by R. Y. Tsai and T. S. Huang, Advances in Computer Vision and Image Processing, vol. 1, JAIPress Inc., 1984), a method based on MAP estimation (refer to "Extraction of high-resolution frames from video sequences", by R. R. Shultz and R. L. Stevenson, IEEE transactions on Image Processing, Vol. 5, No. 6, June 1996), a method by Projection on Convex Sets (refer to "High-resolution image reconstruction from lower-resolution image sequences and space-varying image restoration", by A. M. Tekalp, M. K. Ozkan and M. I. Sezan, Proceedings of IEEE International Conference on Acoustics, Speech and Signal Processing (ICASSP), San Francisco, Calif., vol. 3, March 1992), and the like.

Although the above-described methods in related art, particularly the method based on MAP estimation and the like, can obtain very good results, these methods require a number of input images, resulting in an issue of a very high calculation cost. There is another issue that motion compensation for object blurring is difficult.

Many super resolution technologies assume that a plurality of input low resolution images are obtained by photographing the same scene through stepwise parallel displacement of a camera. There arises, therefore, an issue of object blurring if each individual object moves in a scene, if a camera is moved in a scene having a depth, or in other cases.

Although the technology by R. R. Shultz, et al deals with object blurring, it is necessary to estimate a motion vector of an input image at each pixel position, resulting in an issue of a high calculation cost. The issue associated with this technology is that even if a motion vector is detected from a low resolution input image, a motion vector cannot be estimated correctly because of noises, aliasing and the like.

Accordingly, it is desirable to provide an image processing method, an image processing apparatus, a program or a recording medium, respectively being capable of generating super resolution moving image data from low resolution moving image data with a calculation amount smaller than that in the related art. The present invention has been made in view of the issues existing in the above-described related art.

SUMMARY

According to a first aspect, there is provided an image processing method of converting moving image data formed with a plurality of first image data having a first resolution into moving image data formed with a plurality of second image data having a second resolution, the plurality of first image data being sequentially processed for display. The image processing method includes: a first step of generating position alignment data or positioning data between the first image data to be processed and another first image data other than the first image data to be processed; a second step of aligning a position of or positioning candidate image data having the second resolution corresponding to the first image data to be processed with a position of the other first image data, in accordance with the position alignment data or the positioning data generated by the first step; a third step of updating the candidate image data so as to make small a first difference between the other first image data and the candidate image data position-aligned by the second step; and a fourth step of executing the second step and the third step one time or a plurality of times, and using the candidate image data having the difference equal to or smaller than a reference value, as the second image data corresponding to the first image data to be processed.

A second aspect provides an image processing apparatus for converting moving image data formed with a plurality of first image data having a first resolution into moving image data formed with a plurality of second image data having a second resolution, the plurality of first image data being sequentially processed for display. The image processing apparatus includes: first means for generating position alignment data between the first image data to be processed and another first image data other than the first image data to be processed; second means for aligning a position of candidate image data having the second resolution corresponding to the first image data to be processed with a position of the other first image data, in accordance with the position alignment data generated by the first means; third means for updating the candidate image data so as to make small a first difference between the other first image data and the candidate image data position-aligned by the second means; and fourth means for executing processes by the second means and the third means one time or a plurality of times, and using the candidate image data having the difference equal to or smaller than a reference value, as the second image data corresponding to the first image data to be processed.

A third aspect provides a program to be executed by an image processing apparatus for converting moving image data formed with a plurality of first image data having a first resolution into moving image data formed with a plurality of second image data having a second resolution, the plurality of first image data being sequentially processed for display. The program includes: a first procedure of generating position alignment data between the first image data to be processed and another first image data other than the first image data to be processed; a second procedure of aligning a position of candidate image data having the second resolution corresponding to the first image data to be processed with a position of the other first image data, in accordance with the position alignment data generated by the first procedure; a third procedure of updating the candidate image data so as to make small a first difference between the other first image data and the candidate image data position-aligned by the second procedure; and a fourth procedure of executing the second procedure and the third procedure one time or a plurality of times, and using the candidate image data having the difference equal to or smaller than a reference value, as the second image data corresponding to the first image data to be processed.

A fourth aspect provides a recording medium storing a program to be executed by an image processing apparatus for converting moving image data formed with a plurality of first image data having a first resolution into moving image data formed with a plurality of second image data having a second resolution, the plurality of first image data being sequentially processed for display. The program includes: a first procedure of generating position alignment data between the first image data to be processed and another first image data other than the first image data to be processed; a second procedure of aligning a position of candidate image data having the second resolution corresponding to the first image data to be processed with a position of the other first image data, in accordance with the position alignment data generated by the first procedure; a third procedure of updating the candidate image data so as to make small a first difference between the other first image data and the candidate image data position-aligned by the second procedure; and a fourth procedure of executing the second procedure and the third procedure one time or a plurality of times, and using the candidate image data having the difference equal to or smaller than a reference value, as the second image data corresponding to the first image data to be processed.

The present application can provide an image processing method, an image processing apparatus, a program and a recording medium, respectively being capable of generating super resolution moving image data from low resolution moving image data at a calculation amount smaller than that of the related art.

Additional features and advantages are described herein, and will be apparent from, the following Detailed Description and the figures.

DETAILED DESCRIPTION

An image processing apparatus according to an embodiment will be described below. First, a correspondence will be described between constituent elements of embodiments and constituent elements of the embodiment.

Figure 2:
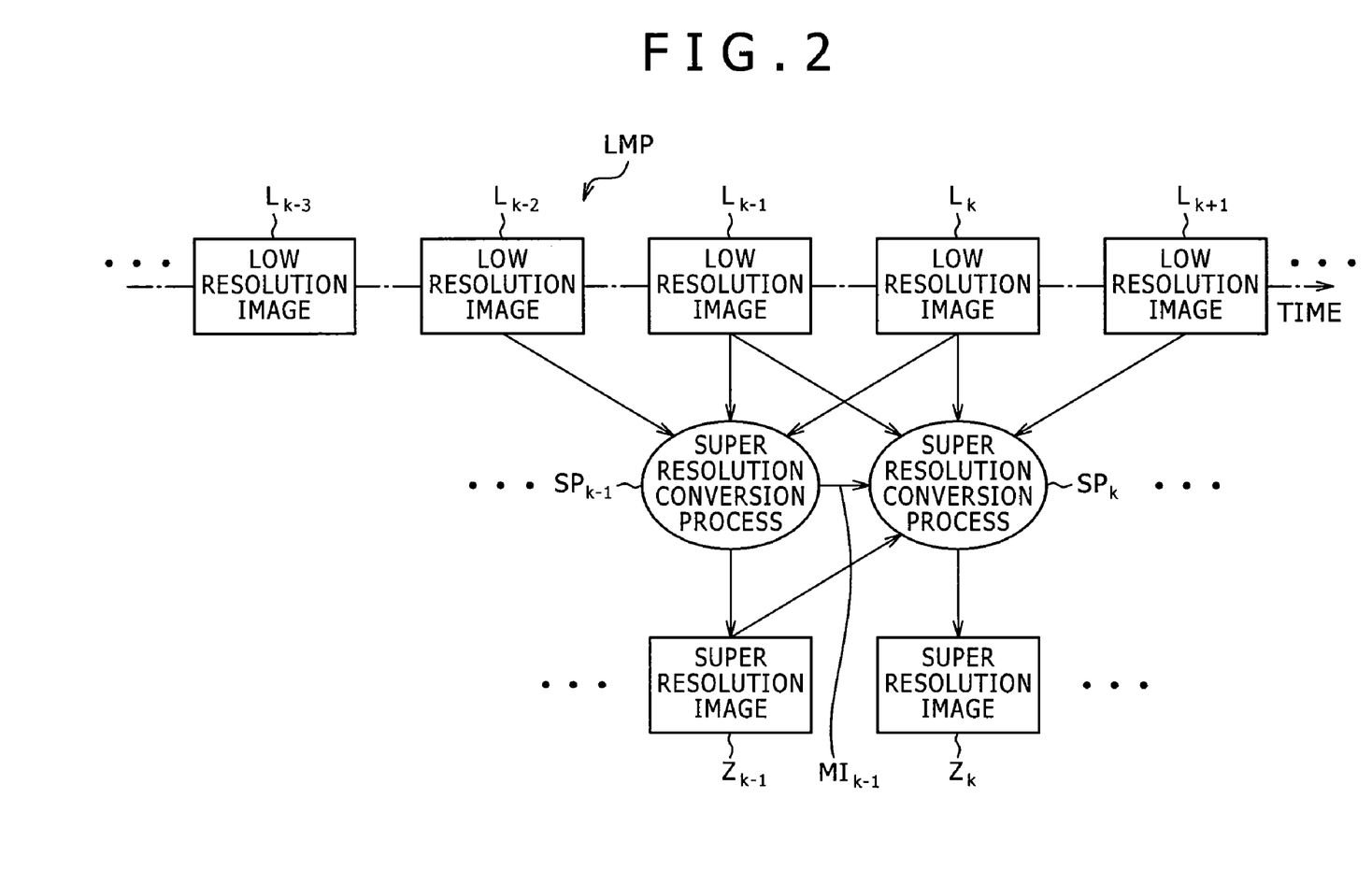
FIG. 2 is a conceptual diagram illustrating the whole procedure of a super resolution conversion process to be executed by the image processing apparatus shown in FIG. 1.

Low resolution image data L shown in FIG. 2 and other Figures is one example of first image data of the embodiment, super resolution image data z is one example of second image data of the embodiment.

Figure 3:
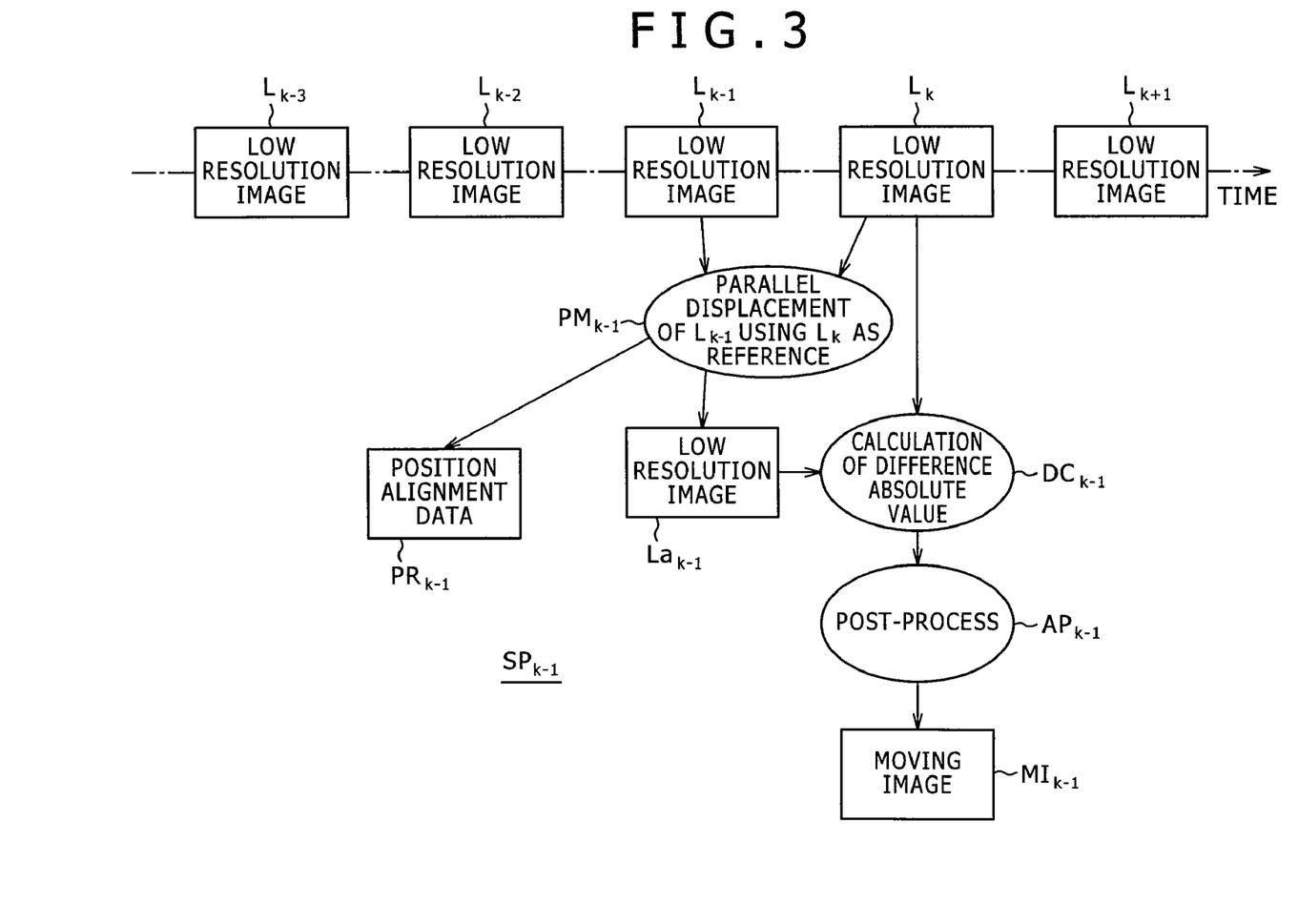
FIG. 3 is a conceptual diagram illustrating a process of generating moving image data $MI_{k-1}$.
Figure 4:
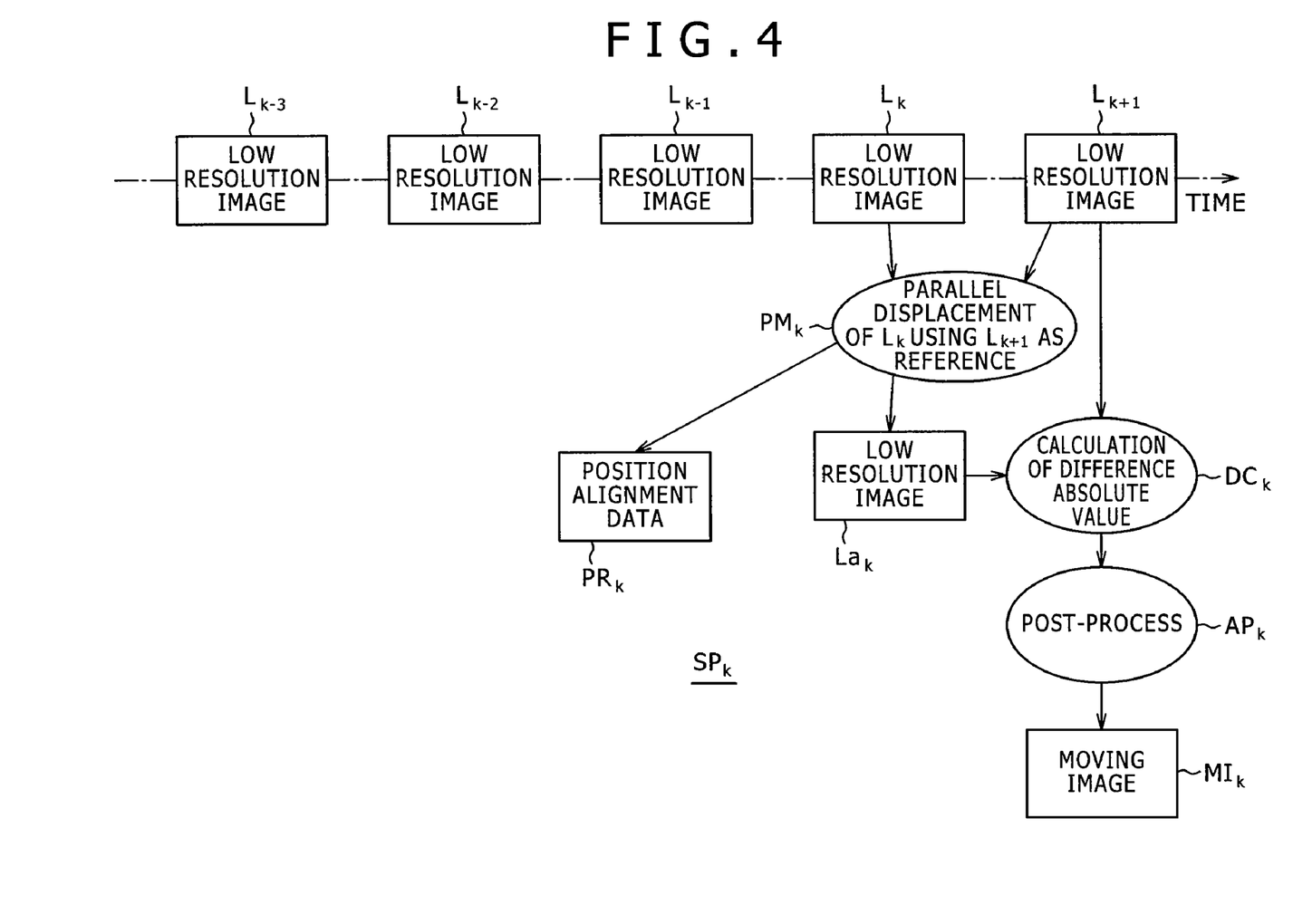
FIG. 4 is a conceptual diagram illustrating a process of generating moving image data $MI_k$.
Figure 7:
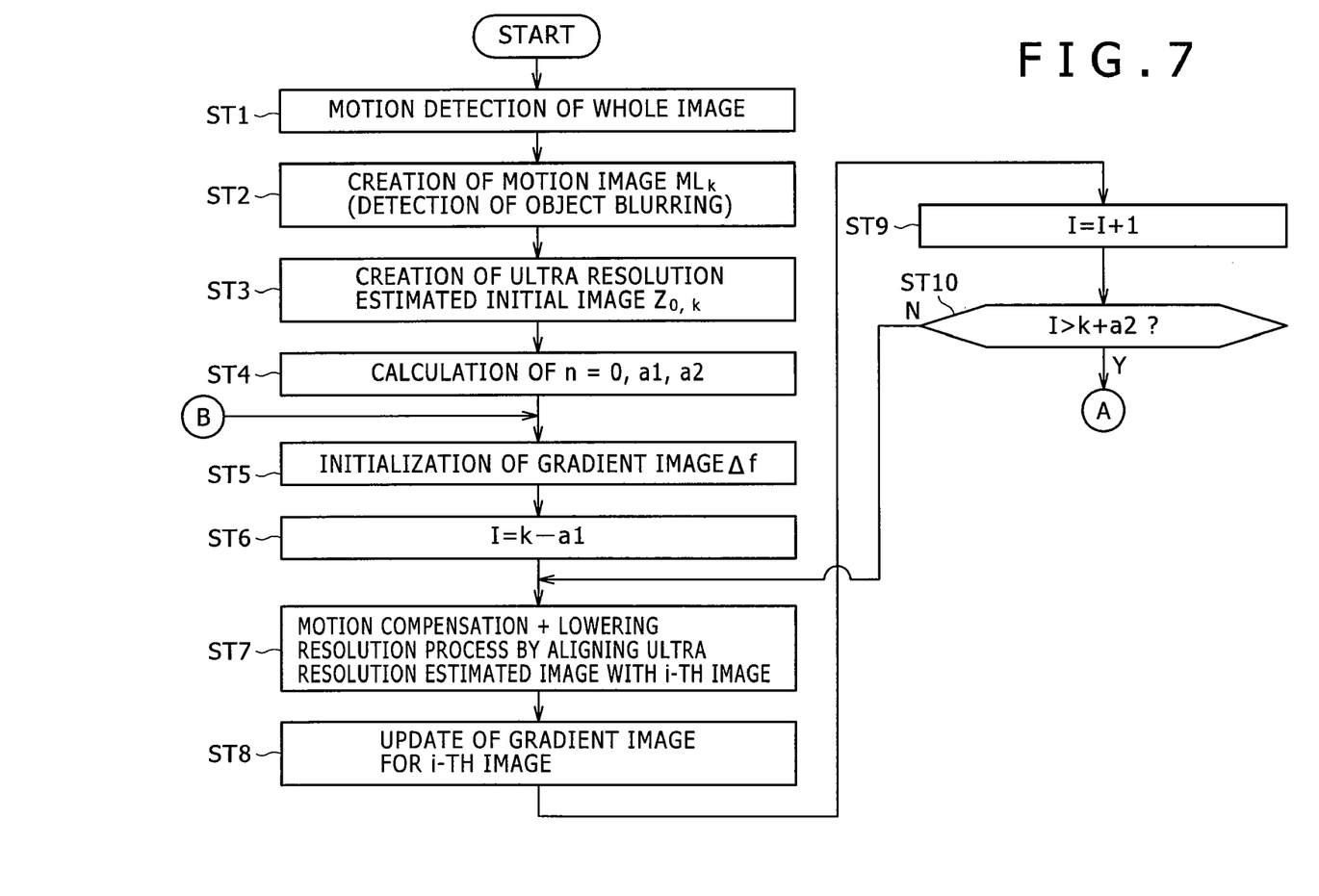
FIG. 7 is a flow chart illustrating processes to be executed by the image processing apparatus shown in FIG. 1.

Processing shown in FIGS. 3 and 4 and a process at Step ST1 shown in FIG. 7 are examples of a second step, a first means and a first procedure of the embodiment.

Figure 6:
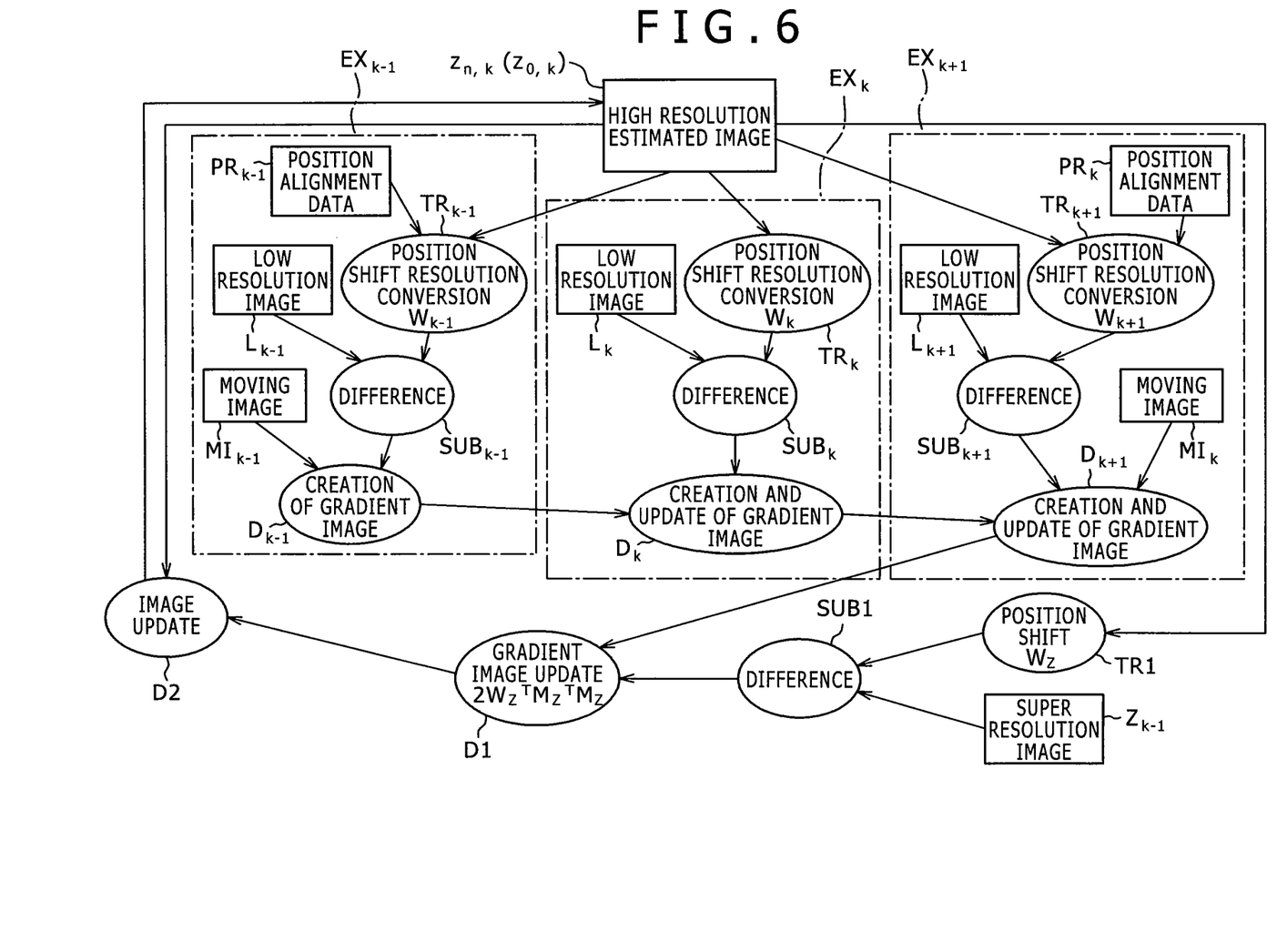
FIG. 6 is a conceptual diagram illustrating a process corresponding to a formula (14) according to an embodiment.

$TR_{k-1}$ and $TR_{k+1}$ shown in FIG. 6 and Step ST7 shown in FIG. 7 are examples of a second step, a second means and a second procedure of the embodiment.

Figure 8:
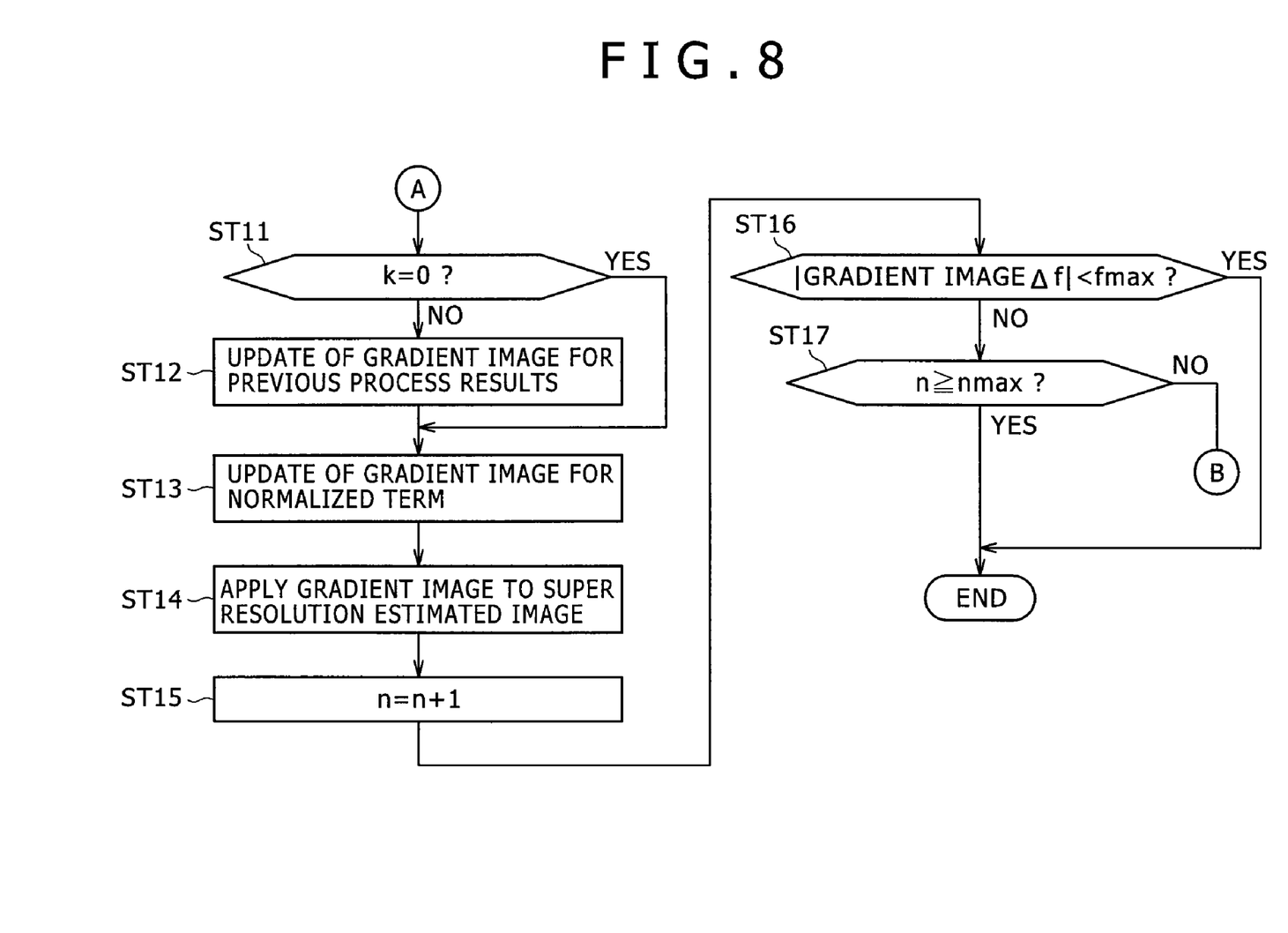
FIG. 8 is a flow chart following the flow chart of FIG. 7, illustrating processes to be executed by the image processing apparatus shown in FIG. 1.

A whole procedure flow shown in FIG. 6 and Steps ST8 to ST17 shown in FIGS. 7 and 8 are examples of a third step, a fourth step, a third means, a fourth means, a third procedure and a fourth procedure of the embodiment.

Figure 1:
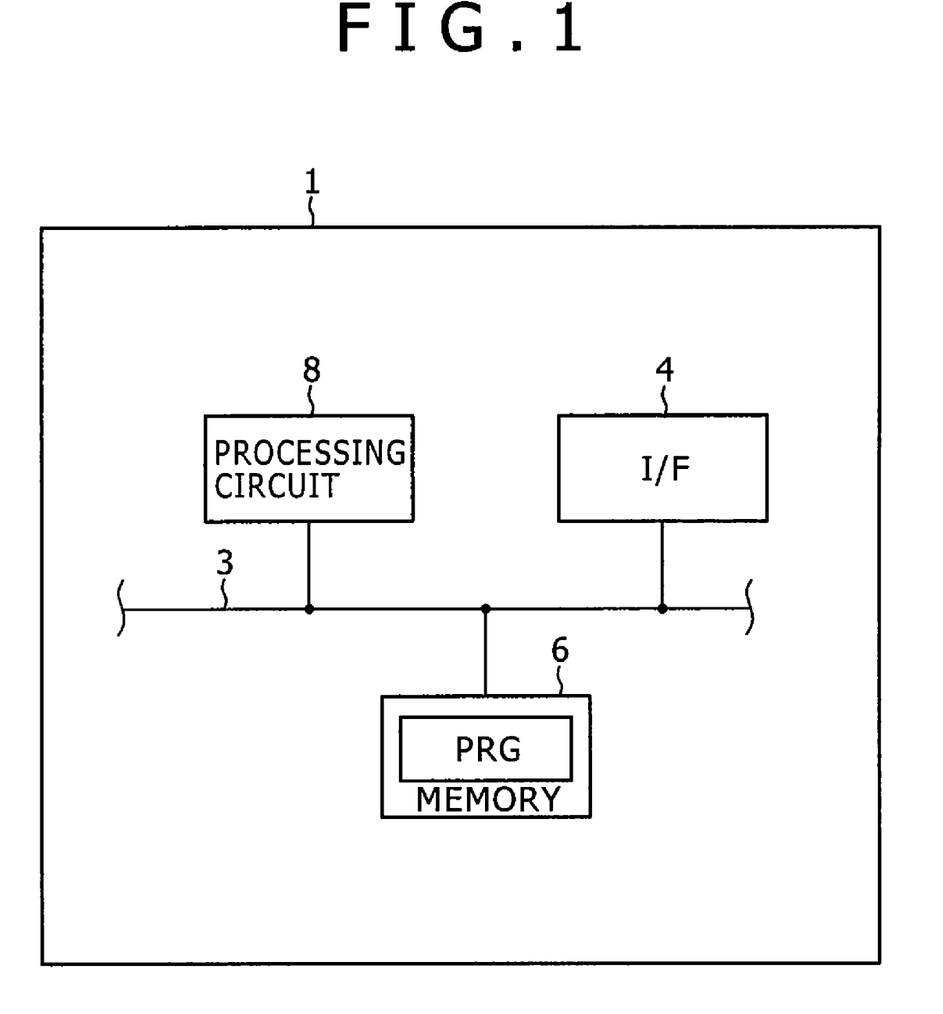
FIG. 1 is a diagram showing the hardware structure of an image processing apparatus according to an embodiment.

FIG. 1 is a diagram showing the whole structure of an image processing apparatus 1 according to an embodiment. As shown in FIG. 1, the image processing apparatus 1 has, for example, an interface 4, a memory 6 and a processing circuit 8 which are interconnected by a data line 3. For example, the interface 4 receives low resolution image data L shown in FIG. 2 and other Figures from an external device disposed outside the image processing apparatus 1.

The low resolution image data L is written, for example, in the memory 6. The memory 6 stores programs PRG defining operations of the processing circuit 8 and data to be used for processing by the processing circuit 8. The processing circuit 8 executes the following super resolution conversion processing in accordance with the program PRG stored in the memory 6.

Prior to describing the details of the image processing apparatus 1, description will be made on the theory on which processing by the image processing apparatus 1 is based. In this embodiment, description will be made on a case which adopts a super resolution theory by MAP estimation.

First, a width of a resolution of predetermined moving image data is represented by w and a height thereof is represented by h. In order to simplify the description, the moving image data is assumed to be grey scale image data. $L_k$ represents image data of a frame number k among moving image data and an wh-dimension vector with respective pixels being disposed in a scan line order. The final target is to estimate an image data sequence of a super resolution corresponding to image data of respective frames of moving image data.

In this embodiment, n represents an integer of 2 or larger, a resolution of super resolution image data to be estimated has a width nw and a height nh. Image data having a frame number k in the super resolution image data sequence to be estimated is represented by $z_k$ which is a $n^2$wh-dimension vector with respective pixels of image data being disposed in a scan line order.

Assuming that super resolution image data $z_k$ of a frame number k exists already, low resolution image data $L_1$ of a frame number 1 different from k can be expressed by the following formula (1).

$$L_1 = W_{k1} z_k + n_k \qquad (1)$$

$W_{k1}$ is a matrix of wh rows and $n^2$wh columns. Times k and 1 are different. $W_{k1}$ is a matrix for performing a motion compensation between times k and 1 and a conversion of generating low resolution image data from super resolution image data. Solving $W_{k1}$ will be later described. Description is made by assuming that $W_{k1}$ is known already. $n_k$ is a wh-dimension vector representing errors to be generated during motion compensation and resolution conversion, noises on image data changing with time, and the like.

In this embodiment, a super resolution image data sequence $\{z_k\}$ is estimated from low resolution input image sequence $\{L_k\}$. In this embodiment, super resolution image data is estimated one frame after frame starting from the time 0. In the following, description will be made on estimating super resolution image data $z_k$ at time k.

In general super resolution technologies, in order to estimate $z_k$, a plurality set of low resolution image data is input including low resolution image data $L_k$ at time k, image data of several frames before and after time k. In the present invention, a image data L1(k−a≦1≦k+a) before and after time k is input.

In this embodiment, in addition to low resolution image data, resultant image data $z_{k-1}$ before one frame is also used as input image data.

The resultant image data $z_{k-1}$ before one frame has a super resolution, reflecting image data of several preceding frames. It is considered that a better result of $z_k$ estimation can be obtained by using the resultant image data as input data.

Super resolution technologies of related art require image data of a large number of frames as the input low resolution image data, resulting in a very high calculation cost. In contrast, since the results of past frames are reused in this embodiment, the amount of input low resolution image data can be made small and a calculation cost can be reduced.

Given low resolution image data $L_1$(k−a≦1≦k+a) of 2a+1 frames and resultant image data $z_{k-1}$ of a super resolution one frame before, $z_k$ is estimated. This method will be described by using maximum posteriori probability estimation (MAP estimation). The following formula means maximizing a probability of whether an estimated value of super resolution image data of a present frame k is proper, relative to low resolution image data presently obtained as observation results and the calculation results of preceding frames.

$$z_k = \underset{z'_k}{\mathrm{argmax}} Pr(z_{n,k} | z_{k-1}, \{L_l(k - a \le l \le k + a)\}) \quad (2)$$

In the formula (2), $z_{n,\,k}$ represent super resolution image data of a frame number k. $Pr(z_{n,\,k}|Z_{k-1}, \{L1(k-a≦1≦k+a)\})$ indicates a conditional probability representative of whether $Z_{n,\,k}$ are proper when $z_{k-1}$ and $\{L_1(k-a≦1≦k+a)\}$ are given. Therefore, $z_{n,\,k}$ giving a maximum conditional probability value are estimated to obtain super resolution image data.

The formula (2) can be modified to the following formula (3) by the Bayesian rule.

$$z_k = \underset{z'_k}{\mathrm{argmax}} \frac{Pr(z_{k-1}, \{L_l(k - a \le l \le k + a)\}|z_{n,k})Pr(z_{n,k})}{Pr(z_{k-1}, \{L_l(k - a \le l \le k + a)\})} \quad (3)$$

Since the content of "argmax" of the formula (3) is a probability, the formula (3) can be modified to the formula (4) by using logarithm.

$$z_k = \underset{z'_k}{\mathrm{argmax}} \log \frac{Pr(z_{k-1}, \{L_l(k - a \le l \le k + a)\}|z_{n,k})Pr(z_{n,k})}{Pr(z_{k-1}, \{L_l(k - a \le l \le k + a)\})} \quad (4)$$

Since it is not necessary to consider a probability that the contents of "argmax" of the formula (4) are not related to $Z_{n,\,k}$, it is possible to neglect the denominator component in the formula (4). Therefore, the formula (4) can be modified to the following formula (5).

$$z_k = \underset{z'_k}{\mathrm{argmax}}(\log Pr(z_{k-1}, \{L_l(k - a \le l \le k + a)\}|z_{n,k}) + \log Pr(z_{n,k}) \quad (5)$$

The formula (5) can further be decomposed to the following formula (6).

$$z_k = \underset{z'_k}{\mathrm{argmax}} \left( \log Pr(z_{k-1}|z_{n,k}) + \sum_{l=k-a}^{k+a} \log Pr(L_l|z_{n,k}) + \log Pr(z_{n,k}) \right) \quad (6)$$

Description will be made on each term in "argmax" in the right side of the formula (6).

First, consider "$Pr(z_{k-1}|Z_{n,\,k})$". This indicates a probability representative of whether the estimation result $z_{k-1}$ of a frame number k−1 one frame before is proper relative to the estimation values $z_{n,\,k}$ of super resolution image data of a frame number k.

Whether $z_{k-1}$ is proper or not can be decided from $Z_{n,\,k}$ subjected to motion compensation and an error from $z_{k-1}$. In this embodiment, this motion compensation is represented by a matrix $W_{zk}$. The matrix $W_{zk}$ is a matrix of $n^2wh \times n^2wh$.

For example, motion vector of $Z_{n,\,k}$ at each pixel, affine transformation of whole image data of $Z_{n,\,k}$, and the like may be used as the matrix $W_{zk}$. In an actual moving image data, each individual object may move in addition to a motion of a camera. If each individual object moves, the object may disappear in one of adjacent frames and appear in the other. In this case, even motion compensation is performed, an error occurs in this area. This embodiment considers this case and defines "$Pr(z_{k-1}|z_{n,\,k})$" by the following formula (7).

$$Pr(z_{k-1}|z_{n,k}) = \frac{1}{\lambda_z} \exp(-\|M_{zk}(z_{k-1} - W_{zk}z_{n,k})\|^2) \quad (7)$$

The formula (7) assumes that a probability has the Gaussian distribution. In the formula (7), λz is a normalization constant, and $M_{zk}$ is a matrix of $n^2wh \times n^2wh$ for removing an error which cannot be covered by the motion compensation $W_{zk}$. For example, if motion compensation for only parallel displacement components of a camera is used as $W_{zk}$, $M_{zk}$ detects a motion of an individual object after $W_{zk}$ is adopted, and if there is a motion, a gain is set to make smaller an error absolute value after conversion, whereas if there is no motion, the gain is set not to change the value after conversion.

Next, similarly "$Pr(L_1|z_{n,\,k})$" is defined by the following formula (8).

$$Pr(L_l|z_{n,k}) = \frac{1}{\lambda_y} \exp(-\|M_{kl}(L_l - W_{kl}z_{n,k})\|^2) \quad (8)$$

In the formula (8), λy is a normalization constant. A matrix $W_{k1}$ represents a coupling between motion compensation from $Z_{n,\,k}$ to a scene represented by low resolution image data $L_l$ and conversion from super resolution image data into low resolution image data.

In accordance with the motion compensation, an area of vertical n pixels and horizontal n pixels of super resolution image data is related to each pixel of low resolution image data, and an average value of pixels contained in each area is converted into a pixel value of low resolution image data.

The matrix $W_{k1}$ is a matrix of $wh \times n^2 wh$. $M_{k1}$ is a matrix of $wh \times n^2 wh$ for removing an error which cannot be covered by $W_{k1}$. For example, if a coupling between motion compensation for only parallel displacement components of a camera and conversion into low resolution image data is used as $W_{k1}$, $M_{k1}$ detects a motion of each individual object after using $W_{k1}$, and if there is a motion, a gain is set to make smaller an error absolute value after conversion, whereas if there is no motion, the gain is set not to change the value after conversion.

Next, "$Pr(z_{n,k})$" will be described.

"$Pr(z_{n,k})$" is a probability representative of whether the estimation values $Z_{n,k}$ of super resolution image data are proper. Various terms are adopted in general super resolution technologies. For example, if the estimation values $Z_{n,k}$ of super resolution image data are proper, a probability distribution assumes that $Z_{n,k}$ are piece-wise smooth. Namely, a probability function is taken into consideration which takes a high value if there are many piece-wise smooth areas and a low value if there are many edged areas.

In this embodiment, "$Pr(z_{n,k})$" is expressed by the following formula (9).

$$Pr(z_{n,k}) = \frac{1}{\lambda_C} \exp(-\|Cz_{n,k}\|^2) \qquad (9)$$

In the formula (9), $\lambda c$ is a normalization constant. C in the formula (9) is a matrix of $n^2 wh \times n^2 wh$ which is a high pass filter. An output of the high pass filter takes a small value for a smooth area and a large value for an edged area. Therefore, in the formula (9), if there are many fine edges in $Z_{n,k}$, then "$Pr(z_{n,k})$" takes a small value, whereas there are no fine edge, "$Pr(z_{n,k})$" takes a large value.

The formula (6) is transformed to the following formula (10) by considering the formulas (7), (8) and (9) and that $\lambda_z$, $\lambda_y$ and $\lambda_C$ are constants.

$$z_k = \underset{z'_k}{\mathrm{argmax}} \begin{pmatrix} \log\left(\frac{1}{\lambda_z} \exp(-\|M_{zk}(z_{k1} - W_{zk}z_{n,k})\|^2)\right) + \\ \sum_{l=k-a}^{k+a} \log\left(\frac{1}{\lambda_y} \exp(-\|M_{kl}(L_l - W_{kl}z_{n,k})\|^2)\right) + \\ \log\left(\frac{1}{\lambda_C} \exp(-\|Cz_{n,k}\|^2)\right) \end{pmatrix} \qquad (10)$$

$$= \underset{z'_k}{\mathrm{argmax}} \begin{pmatrix} -\|M_{zk}(z_{k-1} - W_{zk}z_{n,k})\|^2 - \\ \sum_{l=k-a}^{k-a} \|M_{kl}(L_l - W_{kl}z_{n,k})\|^2 - \|Cz_{n,k}\|^2 \end{pmatrix}$$

$$= \underset{z'_k}{\mathrm{argmax}} \begin{pmatrix} \|M_{zk}(z_{k1} - W_{zk}z_{n,k})\|^2 + \\ \sum_{l=k-a}^{k+a} \|M_{kl}(L_l - W_{kl}z_{nk})\|^2 + \\ \|Cz_{n,k}\|^2 \end{pmatrix}$$

A function f is defined by the following formula (11).

$$f(z_{n,k}) = \qquad (11)$$
$$\|M_{zk}(z_{k-1} - W_{zk}z_{n,k})\|^2 + \sum_{l=k-a}^{k+a} \|M_{kl}(L_l - W_{kl}z_{n,k})\|^2 + \|Cz_{n,k}\|^2$$

By using the function f shown in the formula (11), the formula (10) is transformed to the following formula (12).

$$z_k = \underset{z'_k}{\mathrm{argmin}} f(z_{n,k}) \qquad (12)$$

The issue described herein is an ill-posed inverse problem, so that it cannot be the that a sole solution exists. Therefore, in order to solve the minimizing problem of the formula (12), an optimization method such as the steepest descent method is used.

The steepest descent method is realized by repeating the processing represented by the following formula (13).

$$z_{n+1,k} = z_{n,k} - \alpha \Delta f(z_{n,k}) \qquad (13)$$

In the formula (13), $Z_{n,k}$ are estimation values of super resolution image data to be obtained by repeating the processing n times.

A gradient $\Delta f$ of the function f is given by the following formula (14) based on the formula (11).

$$\Delta f(z_{n,k}) = 2 W_Z^T M_z^T \cdot M_z (W_z z_{n,k} - z_{k-1}) + \qquad (14)$$
$$2 \sum_{l=k-a}^{k+a} W_l^T M_l^T \cdot M_l (W_l z_{n,k} - L_l) + 2 C z_{n,k}$$

In this embodiment, the processing circuit 8 shown in FIG. 1 repeats the processing given by the formula (13). In this case, low resolution image data $L_k$ subjected to an enlargement processing is used as initial estimation values z0 and k of super resolution image data.

Bicubic interpolation generally used or the like is used as the enlargement processing. When the first frame of a moving image data sequence is to be processed, resultant image data $z_{k-1}$ one frame before does not exist. Therefore, the term corresponding to this in the formula (14) is not calculated.

Further, when the moving image data sequence of first a frames and last a frames are converted into super resolution images, there are some missing frames of input low resolution image data $L_1$ in the formula (14). In this case, the processing circuit 8 calculates the formula (14) by using only effective input low resolution image data $L_1$.

The processing circuit 8 of the image processing apparatus 1 shown in FIG. 1 repetitively calculates the formulas (13) and (14) until predetermined conditions are satisfied, in accordance with the program PRG stored in the memory 6 to thereby obtain super resolution image data $Z_k$. The processing by the processing circuit 8 of the embodiment is executed in accordance with the program PRG.

In this embodiment, the processing by the formulas (13) and (14) are called a super resolution conversion processing. In the following, description will be made on an algorithm for executing the processing of the formulas (13) and (14).

The processing circuit 8 shown in FIG. 1 generates high resolution moving image data HMP by subjecting low resolution moving image data LMP shown in FIG. 2 to the super resolution conversion processing.

Specifically, the processing circuit 8 generates super resolution image data Z by sequentially executing the super resolution conversion processing for each of a plurality of low resolution image data L constituting the moving image data LMP, for example, in the display order.

In this case, for example, by using low resolution image data of a processing object, low resolution image data before and after the object low resolution image data, super resolution image data corresponding to low resolution image data before one display order of the object low resolution image data, and motion image data, the processing circuit 8 generates super resolution image data corresponding to the object low resolution image data.

In the example shown in FIG. 2, by using low resolution image data $L_k$ of a processing object, low resolution image data $L_{k-1}$, and $L_{k+1}$, before and after the object low resolution image data, super resolution image data $Z_{k-1}$ corresponding to low resolution image data $L_{k-1}$ before one display order of the object low resolution image data $L_k$, and motion image data $MI_{k-1}$, the processing circuit 8 generates super resolution image data $Z_k$ corresponding to the object low resolution image data $L_k$ by executing the super resolution conversion processing $SP_k$.

The super resolution image data $Z_{k-1}$ and motion image data $MI_{k-1}$ are generated by the super resolution conversion processing $SP_{k-1}$ and stored in the memory 6.

Generation of Moving Image Data $MI_{k-1}$

The processing circuit 8 generates motion image data $MI_{k-1}$ by executing the processing shown in FIG. 3.

Namely as shown in FIG. 3, the processing circuit 8 performs parallel displacement of the low resolution image data $L_{k-1}$ using the low resolution image data $L_k$ as a reference of position alignment to generate low resolution image data $La_{k-1}$ (parallel displacement processing $PM_{k-1}$).

In the position alignment, the processing circuit 8 generates parallel displacement (i, j) by using the following formula (15), where (i, j) is parallel displacement, $L_{k-1}$, (s-i, t-j) is pixel data of the low resolution image data $L_{k-1}$ at a pixel position (s-i, t-j), and $L_k$ (s, t) is pixel data of the low resolution image data $La_{k-1}$. Namely, the processing circuit 8 determines the parallel displacement data (i, j) in such as manner that an absolute value sum of differences of pixels of the low resolution image data $La_{k-1}$ after the parallel displacement and the low resolution image data $L_k$ becomes minimum.

$$(i, j) = \operatorname*{argmin}_{i,j} \sum_{s,t} \|L_k(s-i, t-j) - L_{k-1}(s, t)\| \quad (15)$$

If an enlargement factor of the super resolution conversion processing of the embodiment is n, it is necessary to calculate (i, j) in the unit of 1/n pixel. The image position alignment method includes a block matching method of calculating a total sum of difference absolute values of pixels of all combinations of (i, j), a Lucas-Kanade method using an iterative process ("An Iterative Image Registration Technique with an Application to Stereo Vision", by B. D. Lucas and T. kanade, Proceedings of Imaging Understanding Workshop, 1981), and the like. Any one of these methods may be used in this embodiment.

Next, as shown in FIG. 3, the processing circuit 8 generates difference absolute value data representative of the difference absolute value in the pixel unit between the low resolution image data $La_{k-1}$ generated by the parallel displacement processing $PM_{k-1}$ and the low resolution image data $L_k$ (difference absolute value calculation $DC_{k-1}$).

The difference absolute value data is obtained by detecting a motion of each individual object other the motion of the whole image. Each individual object with motion takes a large pixel value, whereas each individual object without motion takes a small pixel value.

The pixel value of the difference absolute value data is influenced not only by the motion itself of an object but also by noises, aliasing, position alignment errors and the like. It is herein assumed that the pixel value of image data to be generated by factors other than a motion of an object contains a large amount of relatively high frequency components. Namely it is assumed that object blurring changes a pixel value in a relatively large range, whereas noises and position alignment errors change a pixel value in a very local area.

The processing circuit 8 subjects the difference absolute value data to the processing of removing high frequency components by using a low pass filter, a median value filter or the like in a post-processing $AP_{k-1}$, to thereby extract only a motion of an object and generate the moving image data $MI_{k-1}$.

Generation of Moving Image Data MIk

As shown in FIG. 4, the processing circuit 8 generates position alignment data $PR_k$ and moving image data $MI_k$ by executing the processing similar to those described with reference to FIG. 3 for the low resolution image data $L_k$ and $L_{k+1}$.

Generation of $z_{0, k}$

Figure 5:
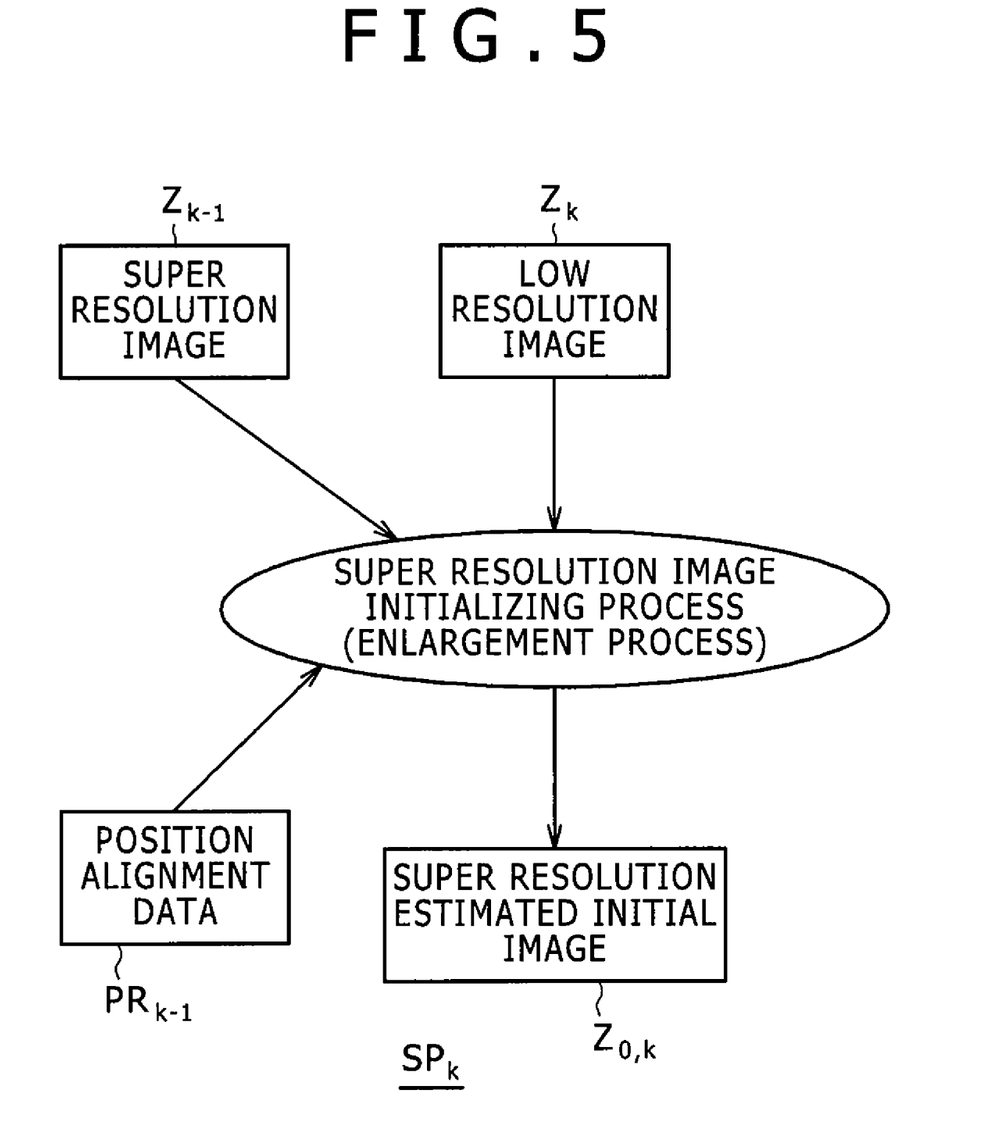
FIG. 5 is a conceptual diagram illustrating a process of generating an initial value of super resolution image data.

The processing circuit 8 generates the super resolution estimation initial image data $Z_{0, k}$ of the super resolution image data $Z_{n, k}$ shown in the formulas (13) and (14), in the manner illustrated in FIG. 5.

The processing circuit 8 executes an enlargement processing to convert the low resolution image data $L_k$ to have n pixels in vertical and horizontal directions.

The enlargement processing is performed by a bicubic interpolation method or the like which are used generally and frequently.

Next, by using the position alignment data $PR_{k-1}$ representative of the parallel displacement data (i, j) generated by the parallel displacement processing $PM_{k-1}$ shown in FIG. 3, the processing circuit 8 performs parallel displacement of the super resolution image data $Z_{k-1}$ generated by the super resolution conversion processing $SP_{k-1}$ shown in FIG. 2 to align the position of the super resolution image data with the position of the low resolution image data $L_k$ after the enlargement processing. This aligned super resolution image data is used as the super resolution estimation initial image data $Z_{0, k}$.

Update Processing of $Z_{n,k}$

FIG. 6 is a diagram illustrating the operation of the processing circuit 8 which sequentially updates the super resolution image data $Z_{n, k}$ by using the formulas (13) and (14). FIG. 6 illustrates the operation under the condition of "a=1" in the formula (14).

The processing circuit 8 calculates the second term of the formula (14) by executing processing $EX_{k-1}$, $EX_k$ and $EX_{k+1}$ shown in FIG. 6.

The processing circuit 8 calculates the first term of the formula (14) by executing a position shift processing TR1, a difference processing SUB1 and a gradient image update processing D1 shown in FIG. 6.

The processing circuit 8 calculates the third term of the formula (14) by executing an image update processing D2 shown in FIG. 6.

First, the processing $EX_{k-1}$ shown in FIG. 6 will be described.

The processing $EX_{k-1}$ is executed for the second term l=k-1 of the formula (14) and includes a position shift/ resolution conversion processing $TR_{k-1}$, a difference processing $SUB_{k-1}$ and a gradient image generation processing $D_{k-1}$.

In the position shift/resolution conversion processing $TR_{k-1}$, by using the position alignment data $PR_{k-1}$ generated by the parallel displacement processing $PM_{k-1}$ shown in FIG. 3, the processing circuit 8 aligns the position of the super resolution estimation image data $Z_{n,k}$ with the position of the low resolution image data $L_{k-1}$ and thereafter converts the resolution into a low resolution. The position shift/resolution conversion processing $TR_{k-1}$ is indicated by the matrix $W_{k-1}$ in the formula (14).

Next, in the difference processing $SUB_{k-1}$, the processing circuit 8 generates difference image data "$W_{k-1}Z_{n,k} - K_{k-1}$" representative of a difference between the low resolution image data generated by the position shift/resolution conversion processing $TR_{k-1}$ and the low resolution image data $L_{k-1}$.

Next, in the gradient image generation processing $D_{k-1}$, the processing circuit generates the matrices $M_{k-1}$ and $M_{k-1}$ in the formula (14) by using the moving image data $MI_{k-1}$ generated by the processing shown in FIG. 3.

The matrix $M_{k-1}$ does not change the value of an object without motion, but lowers the value of an object with motion. Since the low resolution image data $L_{k-1}$ is used as a reference pixel position in the matrix M1, the pixel position of the moving image data $MI_{k-1}$ is corrected.

In the gradient image generation processing $D_{k-1}$, the processing circuit 8 converts the difference image data generated by the difference processing $SUB_{k-1}$ by using the matrix $W_{k-1}^T M_{k-1}^T M_{k-1}$ to generate "$W_{k-1} M_{k-1}^T M_{k-1}(W_{k-1} Z_{n,k} - L_{k-1})$".

Next, the processing $EX_k$ shown in FIG. 6 will be described.

The processing $EX_k$ is executed for the second term $1=k$ of the formula (14) and includes a position shift/resolution conversion processing $TR_k$, a difference processing $SUB_k$ and a gradient image generation/update processing $D_k$.

In the position shift/resolution conversion processing $TR_k$, the processing circuit 8 converts the super resolution estimation image data $Z_{n,k}$ into the low resolution image data. The position shift/resolution conversion processing $TR_k$ is indicated by the matrix $W_k$ in the formula (14).

Next, in the difference processing $SUB_k$, the processing circuit 8 generates difference image data "$W_k Z_{n,k} - L_k$" representative of a difference between the low resolution estimation image data generated by the position shift/resolution conversion processing $TR_k$ and the low resolution image data $L_k$.

Next, in the gradient image generation/update processing $D_k$, the processing circuit 8 does not execute the motion compensation processing but generates "$W_k^T(W_k Z_{n,k} - L_k)$" by multiplying only the matrix $W_k^T$.

In the gradient image generation/update processing $D_k$, the processing circuit 8 adds "$W_{k-1} M_{k-1}^T M_{k-1}(W_{k-1} Z_{n,k} - L_{k-1})$" generated by the gradient image generation processing $D_{k-1}$ and "$W_k^T(W_k Z_{n,k} - L_k)$".

Next, the processing $EX_{k+1}$ shown in FIG. 6 will be described.

The processing $EX_{k+1}$ is executed for the second term $1=k+1$ in the formula (14) and includes a position shift/resolution conversion processing $TR_{k+1}$, a difference processing $SUB_{k+1}$ and a gradient image generation/update processing $D_{k+1}$.

In the position shift/resolution conversion processing $TR_{k+1}$, by using the position aligned data $PR_{k+1}$ generated by the parallel displacement processing $PM_{k+1}$ shown in FIG. 4, the processing circuit 8 aligns the position of the super resolution estimation image data $Z_{n,k}$ with the position of the low resolution image data $L_{k+1}$, and thereafter the resolution is converted into the low resolution. The position shift/resolution conversion processing $TR_{k+1}$ is indicated by the matrix $W_{k+1}$ in the formula (14).

Next, in the difference processing $SUB_{k+1}$, the processing circuit 8 generates difference image data "$W_{k+1}Z_{n,k} - L_{k+}$" representative of a difference between the low resolution estimation image data generated by the position shift/resolution conversion processing $TR_{k+1}$ and the low resolution image data $L_{k+}$.

Next, in a gradient image generation processing $D_{k+1}$, the processing circuit 8 generates the matrices $M_{k+1}$, $M_{k+1}^T$ by using the moving image data $MI_{k+1}$ generated by the processing shown in FIG. 4.

The matrix $M_{k+1}$ does not change the value of an object without motion, but lowers the value of an object with motion. Since the low resolution image data $L_{k+1}$ is used as a reference pixel position in the matrix MI, the pixel position of the moving image data $MI_{k+1}$ is corrected.

In the gradient image generation processing $D_{k+1}$, the processing circuit 8 converts the difference image data generated by the difference processing $SUB_{k+1}$ by using the matrix $W_{k+1}^T M_{k+}^T M_{k+1}$ to generate "$W_{k+1}Z_{n,k} - L_{k+1}$".

In the gradient image generation processing $D_{k+1}$, the processing circuit 8 adds "$W_{k-1}M_{k-1}^T M_{k-1}(W_{k-1}Z_{n,k} - L_{k-1}) + W_k^T(W_k Z_{n,k} - L_k)$" generated by the gradient image generation/update processing $D_{k-1}$ and "$W_{k+1}M_{k+}^T M_{k+1}(W_{k+1}Z_{n,k} - L_{k+1})$", thereby generating the second term in the formula (14).

Position Shift Processing TR1, Difference Processing SUB1

In the position shift processing TR1, the processing circuit 8 executes a position alignment processing by motion compensation for the super resolution estimation image data $Z_{n,k}$ (matrix $W_{zk}$).

In the difference processing SUB1, the processing circuit 8 generates difference data "$W_{Zk}Z_{n,k} - Z_{k-1}$" representative of a difference between the super resolution estimation image data $Z_{n,k}$ after the position alignment and the super resolution image data $Z_{k-1}$ generated by the super resolution conversion processing $SP_{k-1}$ shown in FIG. 2.

Gradient Image Update Processing D1

In a gradient image update processing D1, the processing circuit 8 converts ($W_{zk}Z_{n,k} - Z_{k-1}$) generated by the difference processing SUB1 by using a conversion $2W_{zk}^T M_{zk}^T M_{zk}$.

The matrix $M_{k-1}$ used by the gradient image generation processing $D_{k-1}$ is used as the conversion matrix $M_{zk}$.

The matrix $W_{k-1}$ used by the position shift/resolution conversion processing $TR_{k-1}$ is used as the conversion matrix $W_{zk}$.

The conversion result corresponds to the processing result of the first term in the formula (14).

In the gradient image update processing D1, the processing circuit 8 adds the processing result of the second term in the formula (14) generated by the gradient image generation/update processing $D_{k+1}$ and the processing result of the first term in the formula (14) generated by the conversion.

Image Update Processing D2

In the image update processing D2, the processing circuit 8 executes a high pass filter processing C for the super resolution estimation image data $Z_{n,k}$ and adds the filter output to the addition result by the gradient image update processing D1 to generate $\Delta f(z_{n, k})$ in the formula (14).

The processing circuit 8 multiplies $\Delta f(Z_{n, k})$ by a predetermined scalar value α to generate new super resolution estimation image data $Z_{n+1, k}$.

The processing circuit 8 judges whether $\Delta f(z_{n,k})$ is equal to or smaller than a predetermined threshold value.

If the processing circuit 8 judges that $\Delta f(z_{n, k})$ is equal to or smaller than the predetermined threshold value, the super resolution estimation image data $Z_{n, k}$ is used as the super resolution estimation image data $Z_k$.

If the processing circuit 8 judges that $\Delta f(Z_{n, k})$ is neither equal to nor smaller than the predetermined threshold value, the processing shown in FIG. 6 are repeated for the new super resolution estimation image data $Z_{n+1, k}$.

Example of an Overall Operation of the Image Processing Apparatus 1

FIGS. 7 and 8 are flow charts illustrating an example of the overall operation of the image processing apparatus 1.

Steps ST1 and ST2:

The processing circuit 8 shown in FIG. 1 executes the processing shown in FIG. 4 to generate position alignment data $PR_k$ and moving image data $MI_k$ for the low resolution image data $L_k$ and $L_{k+1}$.

Step ST3:

By using the generated position alignment data $PR_k$, the low resolution image data $Z_k$ and the super resolution image data $Z_{k-1}$, the processing circuit 8 executes the super resolution image initializing processing described with reference to FIG. 5 to generate super resolution estimation initial image data $Z_{0, k}$.

Step ST4:

The processing circuit 8 initializes the number n of repetition times to 0 and sets constants a1 and a2 for designating low resolution images to be input for a super resolution processing.

As described earlier, a low resolution image at a time k and a low resolution images before and after the time k are used ("a" is a preset constant). Since an exceptional processing is required for processing first "a" frames and last "a" frames of moving images, a1 and a2 are set.

The processing circuit 8 sets a1=k if k<a, and a1=a if k≧a. The processing circuit 8 sets a2=kmax−k if k+a>kmax, and a2=a if k+a≦kmax.

Step ST5:

The processing circuit 8 initializes $\Delta f(Z_{n,k})$ to a null vector.

Step ST6:

The processing circuit 8 substitutes "k−a1" into 1.

Step ST7:

The processing circuit 8 executes the position shift/resolution conversion processing $W_{k-1}$, $W_k$ or $W_{k+1}$ shown in FIG. 6.

Step ST8:

The processing circuit 8 executes the difference processing $SUB_{k-1}$, $SUB_k$ or $SUB_{k+1}$ and the gradient image generation processing $D_{k-1}$, $D_k$ or $D_{k+1}$.

Step ST9:

The processing circuit 8 increments the variable 1 by "1".

Step ST10:

The processing circuit 8 judges whether the variable 1 is larger than "k+2a", and if it is judged larger, the flow advances to Step ST11, whereas if not, the flow returns to Step ST7.

Step ST11:

The processing circuit 8 judges whether k is "0", and if k is "0", the flow skips to Step ST13, whereas if not, the flow advances to Step ST12.

Step ST12:

The processing circuit 8 executes the position shift processing TR1 and difference processing SUB1 shown in FIG. 6.

Step ST13:

The processing circuit 8 executes the gradient image update processing D1 shown in FIG. 6 to add the calculation result of the second term in the formula (14) generated by the gradient image generation/update processing $D_{k+1}$ and the processing result of the first term in the formula (14) generated by the conversion.

Step ST14:

The processing circuit 8 executes the image update processing D2 shown in FIG. 6 to generate new super resolution estimation image data $Z_{n+1, k}$.

Step ST15:

The processing circuit 8 increments the variable n by "1".

Step ST16:

The processing circuit 8 judges whether the gradient image $\Delta f$ generated by the image update processing D is smaller than "fmax", and if it is judged smaller, the processing is terminated and the super resolution estimation image data $Z_{n, k}$ is used as the super resolution image data $Z_k$.

If the processing circuit 8 judges that the gradient image $\Delta f$ generated by the image update processing D is not smaller than "fmax", the flow advances to Step ST17.

Step ST17:

The processing circuit 8 judges whether the variable n is equal to or larger than "nmax", and if it is judged that the variable is equal to or larger than "nmax", the processing is terminated (the super resolution estimation image data $Z_{n, k}$ is used as the super resolution image data $Z_k$), whereas if not, the flow returns to Step ST5.

As described so far, according to the image processing apparatus 1, the position of the super resolution image data $Z_{k-1}$ of the already generated low resolution image data $L_{k-1}$ is aligned with the position of the low resolution image data $L_k$, and the super resolution image data $Z_k$ is sequentially updated in the manner to make small a difference between the super resolution image data and low resolution image data.

The super resolution image data can be generated by a smaller calculation amount than that used by a related art's system which calculates motion vector for each pixel data.

In a related art system, motion vector may not be calculated properly because of superposition of objects, aliasing or noises. According to the image processing apparatus 1, for the motion compensation, after the motion compensation for a whole image is performed, presence/absence of a motion of each individual object other then a motion of the whole image is detected, and in accordance with this detection, the super resolution processing is performed for an area of an object without motion. It is therefore possible to suppress the influence of aliasing and noises. An area of an object with motion is not reflected upon the super resolution processing result, so that object blurring is hard to be formed.

Since the image processing apparatus 1 processes a plurality of consecutive images of moving images, it is possible to suppress noises changing with time, flicker of a fluorescent lamp and the like.

A weight of a moving object area indicated by the formula (14) becomes small because of motion compensation for a motion of an individual object. With this small weight, an update amount for other still object areas becomes small.

Namely, a moving object area of the super resolution image at the time k is an image similar to a simple enlarged image of the low resolution image data $L_k$ at the time k. Since the image processing apparatus 1 considers the following two points, proper processing can be executed.

(1) It is assumed that the low resolution image data $L_{k-1}$ and $L_{k+1}$ at the times k−1 and k+1 and also the super resolution image data $Z_{k-1}$ at the time k−1 largely contribute also to the moving object area. With this assumption, a moving object in the resultant image $Z_k$ has an image tailing the object and becomes an unnatural image.

(2) When a moving image is reproduced actually, human being cannot sense a fine image at a high resolution in the moving object area.

The present invention is not limited to the above-described embodiment. Namely, it will be apparent to those skilled in the art that various modifications, combinations, sub-combinations and substitutes can be made without departing from the technical range of the present invention or in the equivalent range thereof.

For example, although the processing for moving images of a grey scale has been described in the embodiments, the present invention is also applicable to color moving images. A color image is separated into luminance components and color components, and motion compensation including position alignment and the like is performed for the luminance components. By using this motion compensation result, the super resolution processing with the iterative processing is executed for the luminance components and color components. The super resolution processing may be executed by synthesizing image data generated by the super resolution processing with the iterative processing and executed only for the luminance components and image data generated by enlarging the color components by the bicubic interpolation or the like. In this case, a calculation cost can be reduced.

Although all three terms in the right side of the formula (14) are used to generate Δf in the embodiments, Δf may be generated by using only the first term, second term or both first and second terms.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An image processing method for converting moving image data formed with a plurality of first image data having a first resolution into moving image data formed with a plurality of second image data having a second resolution, the plurality of first image data being sequentially processed for display, the image processing method comprising:

a first step including generating position alignment data between the first image data to be processed and another first image data other than the first image data to be processed;

a second step including aligning a position of candidate image data having the second resolution corresponding to the first image data to be processed with a position of the other first image data, in accordance with the position alignment data generated by the first step;

a third step including updating the candidate image data so as to minimize a first difference between the other first image data and the candidate image data position-aligned by the second step; and a fourth step including executing the second step and the third step at least one time, and using the candidate image data having the difference equal to or smaller than a reference value, as the second image data corresponding to the first image data to be processed;

a fifth step including generating an initial value of the candidate image data in accordance with the first image data to be processed and the second image data already generated for another first image data other than the first image data to be processed;

wherein the initial value generated by the fifth step is used as the candidate image data at the second step to be executed before the third step is executed for the first time.

2. The image processing method according to claim 1, wherein the third step includes aligning a position of the candidate image data with a position of the second image data already generated for another first image data other than the first image data to be processed, and after position alignment, generates a second difference therebetween, and updates the candidate image data so as to further reduce the second difference.

3. The image processing method according to claim 2, wherein the third step includes updating the candidate image data so as to further reduce a total sum of data obtained by subjecting the candidate image data to a high pass filter processing, the first difference and the second difference.

* * * * *